United States Patent [19]

Althoff et al.

[11] Patent Number: 5,123,260
[45] Date of Patent: Jun. 23, 1992

[54] THRUST BEARING FOR AUGER TYPE ICE MAKER

[75] Inventors: Kenneth L. Althoff, Hoffman Estates; James J. Boesen, Palatine, both of Ill.

[73] Assignee: Wilshire Corporation, Schaumburg, Ill.

[21] Appl. No.: 783,362

[22] Filed: Oct. 28, 1991

[51] Int. Cl.⁵ .................................................. F25C 1/14
[52] U.S. Cl. ...................................... 62/354; 384/908; 384/909
[58] Field of Search ................... 62/354; 384/420, 908, 384/909

[56] References Cited

U.S. PATENT DOCUMENTS

| | | | |
|---|---|---|---|
| Re. 28,924 | 8/1976 | Neumann et al. | 62/320 |
| 2,908,535 | 10/1959 | Runton et al. | 308/163 |
| 3,574,427 | 4/1971 | Faull | 308/135 |
| 3,803,869 | 4/1974 | Neumann et al. | 62/320 |
| 3,844,134 | 10/1974 | Krueger et al. | 62/354 |
| 3,863,463 | 2/1975 | Utter et al. | 62/354 |
| 3,892,337 | 7/1975 | Neumann | 222/199 |
| 4,058,383 | 11/1977 | Peterson | 62/85 |
| 4,386,455 | 6/1983 | Drasche | 384/300 X |
| 4,426,851 | 1/1984 | Neumann | 62/126 |
| 4,741,173 | 5/1988 | Neumann | 62/298 |

FOREIGN PATENT DOCUMENTS 54-134954  9/1979  Japan.

Primary Examiner—William E. Tapolcai
Attorney, Agent, or Firm—Body, Vickers & Daniels

[57] ABSTRACT

An ice maker having an auger which rotates within a cylindrical body on the inner surface of which ice crystals are formed to scrape the crystals off the surface and advance them upwardly in to the extruding passage of an extruding head above the auger to form hard bodies of ice which are broken into pieces and stored in a reservoir surrounding the head. A thrust bearing disposed between the head and a portion of the auger shaft extending above the head is made up of two thin disks of different low friction materials both of which are hygroscopic. The bearing assembly operates in the moist atmosphere of the housing so that the hygroscopic elements absorb moisture which produces dimensional changes in the disks to compensate for material lost by frictional wear.

12 Claims, 1 Drawing Sheet

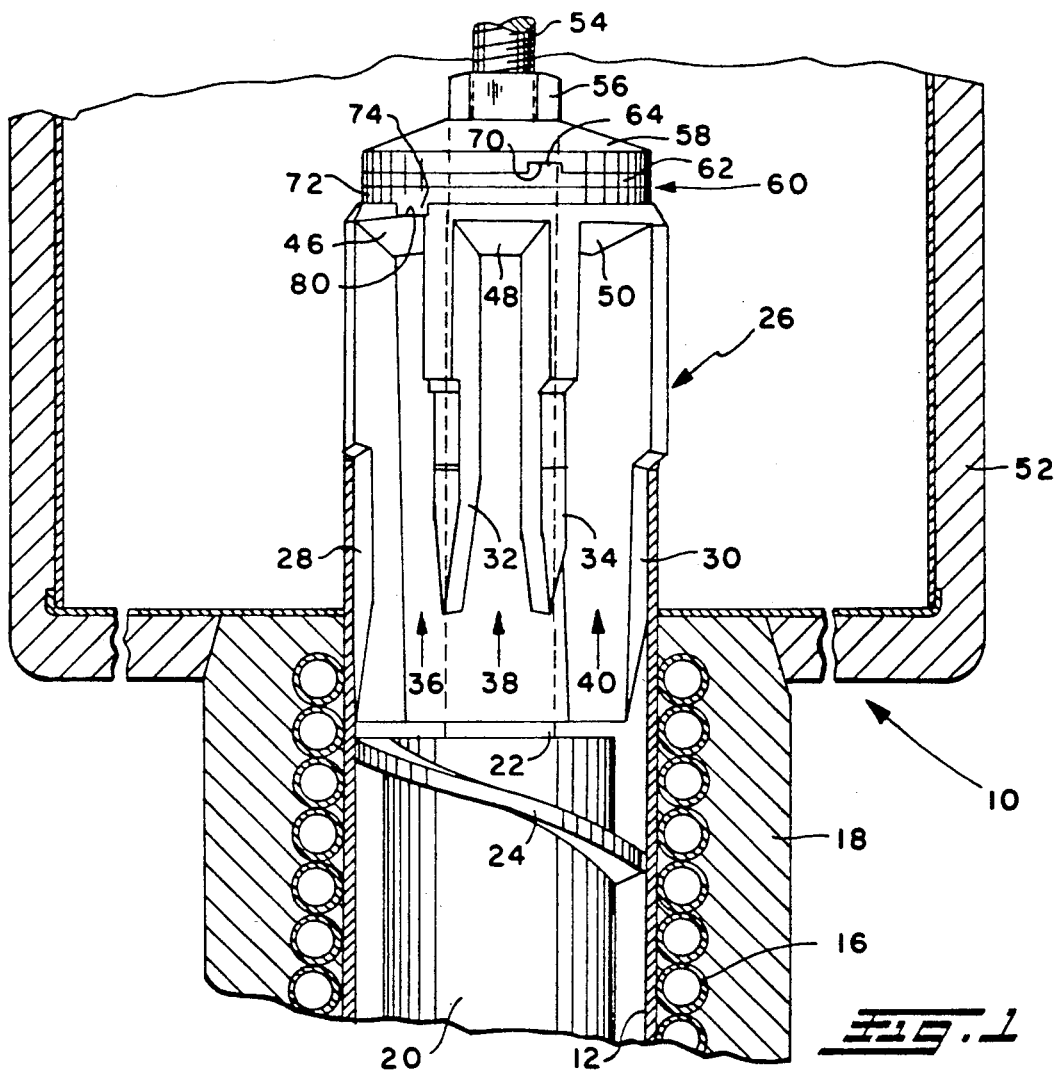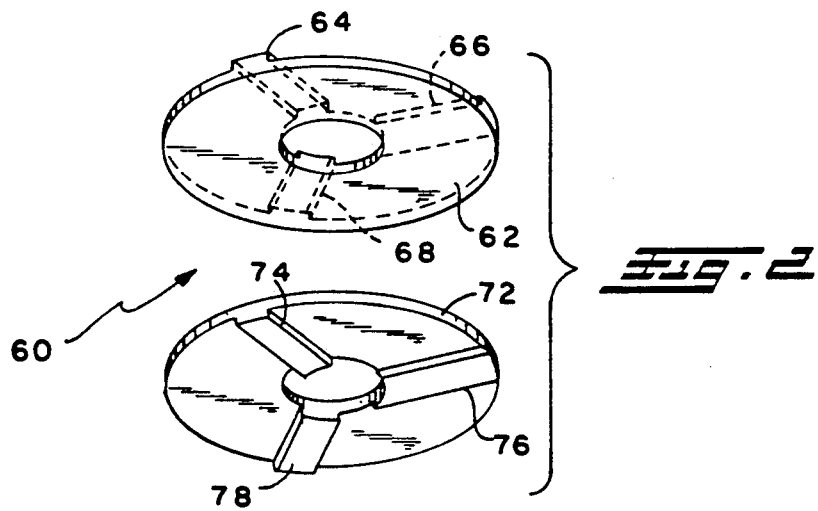

THRUST BEARING FOR AUGER TYPE ICE MAKER

FIELD OF THE INVENTION

The invention is in the field of auger type ice makers and more particularly relates to an improved thrust bearing for use in an auger type ice maker.

BACKGROUND OF THE INVENTION

There are known in the prior art ice makers of the type in which an auger blade scrapes ice particles off a cylindrical surface and forces the particles into an extruding head. As the particles are compressed in the head, they form rods of hard ice. Means are provided for breaking the rods into pieces which are stored in a reservoir and dispensed on demand.

One type of ice maker of the type described hereinabove is shown in FIGS. 9-11 of patent No. 4,741,173. In the ice maker shown therein, the auger shaft extends upwardly through a bore in the extruding head and an extension thereof above the head receives a thrust bearing, a cap and a nut. The thrust bearing is formed over a relatively thick body of a suitable material such as polypropylene.

In the arrangement just described, the relatively thick disk which forms the thrust bearing under certain conditions retains heat created by friction and wears relatively quickly or cold flows. The life of the bearing is relatively short so that it must be replaced at relatively frequent intervals.

SUMMARY OF THE INVENTION

One object of our invention is to provide an improved thrust bearing for an auger type ice maker.

Another object of our invention is to provide a thrust bearing for an auger type ice maker which has a longer life than do ice maker thrust bearings of the prior art.

Another object of our invention is to provide an improved thrust bearing for an auger type ice maker which is simple in construction for the result achieved thereby.

Other and further objects of our invention will appear from the following description.

BRIEF DESCRIPTION OF THE DRAWINGS

In the accompanied drawings to which reference is made in the instant specification and which are to be read in conjunction therewith, and in which like reference characters are used to indicate like parts in the various views:

FIG. 1 is a fragmentary section of an auger type ice maker provided with our improved thrust bearing.

FIG. 2 is an exploded view of the form of our improved auger type ice maker thrust bearing employed in the ice maker illustrated in FIG. 1.

DESCRIPTION OF THE PREFERRED EMBODIMENT

Referring now to the drawing, an ice maker indicated generally by the reference character 10, equipped with our improved thrust bearing to be described hereinbelow, includes an evaporator tube 12 surrounded by a coil 16 carrying refrigerant in a manner known to the art. An insulating jacket 18 encloses the coil 16.

An auger 20 extending vertically through the tube 12 has a shaft 22 which is driven in a manner known to the art to cause the auger blade 24 to scrape ice crystals off the inner cylindrical surface of the tube 12.

Ice crystals scraped off the inner surface of the tube 12 are forced upwardly by the auger toward an extruding head indicated generally by the reference character 26, which is held against rotation relative to the tube 12 by any suitable means known to the art. The head 26 had a plurality of relatively long fins, two of which 28 and 30, are shown in the drawing as extending the full length of head 26. Located between the relatively longer fins 28 and 30, are shorter fins, two of which 32 and 34, are shown in the drawing.

The fins 28, 30, 32 and 34, form ice extruding passages indicated by the arrows 36, 38 and 40 into which the ice particles are forced by the auger 20. As the particles are forced upwardly into the passages 36, 38 and 40 they form relatively hard rods of ice.

The head 26 is formed with breaker surfaces 46, 48 and 50 which are inclined relative to the axis of rotation of the auger so as to break the rods of ice into pieces as the rods are forced upwardly against the surfaces 46, 48 and 50. The broken pieces are stored in a reservoir 52, surrounding the head 26 and from which the pieces may be dispensed on demand.

The structure just described is the same as that of the ice maker illustrated in FIGS. 9-11 of patent No. 4,741,173 which is incorporated by reference herein.

Auger shaft 22 extends upwardly through a bore in the extruding head 26 and above the head to a threaded reduced portion 54 which receives a nut 56 to hold a cap 58 and our improved bearing assembly indicated generally by the reference character 60 in assembled position.

Our improved thrust bearing assembly 60 includes a relatively thin upper bearing disk 62, the upper surface of which is provided with three ribs 64, 66 and 68, which are received in complimentary recesses 70 in the under surface of cap 58 to hold the disk 62 against rotation relative to the cap.

Our improved thrust bearing assembly 60 includes a lower relatively thin bearing disk 72, the under surface of which is provided with ribs 74, 76 and 78, which are received in complimentary recesses 80 formed in the upper surface of the extruding head 26.

In operation of the ice maker upper disk 62 rotates with the shaft 54 while the lower bearing disk 72 is held against rotation relative to the extruding head 26. As a result, thrust forces are applied through the relatively rotatable under surface of disk 62 and upper surface of disk 72.

We form the disk 62 and 72 of different thermoplastic materials, both of which are hygroscopic and have low coefficients of friction. For example, one of the disks is an acetal and the other a nylon.

It will readily be appreciated from the description hereinabove that our bearing assembly 60 operates in an atmosphere in which moisture is present. As the disks rotate relative to each other, a certain amount of material is lost owing to frictional wear. However, our disks, being formed of hygroscopic material will absorb ambient moisture. The result is slight dimensional changes such as increase the thickness of the disks to replaced material lost by frictional wear.

Another advantage of our improved thrust bearing assembly 60 is that it allows a stable operating temperature. That is, it will not become overheated in use.

It will be seen that we have accomplished the objects of our invention. We have provided an improved thrust bearing assembly for an auger type ice maker which overcomes the defects of ice maker thrust bearings of the prior art. Our improved thrust bearing has a relatively long life and use. It is simple in construction for the result achieved thereby.

It will be understood that certain features and subcombinations are of utility and may be employed without reference to other features in sub-combinations. This is contemplated by and is within the scope of our claims. It is further obvious that various changes may be made in details within the scope of our claims, without departing from the spirit of our invention. It is therefore to be understood that our invention is not to be limited to specific details shown and described.

Having thus described our invention, what we claim is:

1. An ice maker including in combination, means providing a generally cylindrical surface on which ice crystals are formed, an extruding head having an extruding passage for receiving ice crystals and compressing said crystals into a hard body of ice, means mounting said extruding head in operative relationship with said surface providing means, an auger, means mounting said auger in operative relationship with said surface and said head for rotary movement relative thereto to scrape ice crystals off said surface and to force said crystals into said passage to cause said crystals to be formed into said hard body of ice and a thrust bearing assembly for absorbing thrust forces as said crystals are forced into said passage upon rotation of said auger, said thrust bearing assembly comprising a first bearing element rotatable with said shaft and a second bearing element restrained against rotation relative to said head, said bearing elements being formed of different low friction materials, each of said low friction materials being hygroscopic.

2. An ice maker in claim 1 in which one of said materials is nylon.

3. An ice maker as in claim 1 in which one of said materials is an acetal.

4. An ice maker as in claim 1 in which one of said materials is an acetal and the other of said materials is nylon.

5. An ice maker including in combination, a vertically extending tubular body having an inner surface on which ice crystals are formed, an auger, means mounting said auger within said tube for rotary movement relative thereto to scrape ice crystals off said surface and advance said crystals upwardly, an extruding head having an extruding passage for receiving ice crystals and compressing said crystals into a hard body of ice, means mounting said head on said tubular body above said auger so that ice crystals scraped off said surface by said auger are advanced upwardly in said passage, said head having a bore, said auger having a shaft extending upwardly through said bore and a thrust bearing assembly between said shaft and said head, said thrust bearing assembly comprising a first think disk coupled to said shaft for rotation therewith and a second thin disk restrained against rotation relative to said head, said disks being formed of different materials, each of which is hygroscopic.

6. An ice maker as in claim 5 including an ice reservoir around said head and said bearing assembly and means for breaking said rod into pieces of ice received in said reservoir whereby said bearing assembly operates in a moist atmosphere.

7. An ice maker as in claim 6 in which one of said materials is nylon.

8. An ice maker as in claim 6 in which one of said materials is acetal.

9. An ice maker as in claim 6 in which one of said materials is nylon and the other of said materials is acetal.

10. An ice maker as in claim 6 including a cap carried by said shaft and interengageable means on said cap and said first disk for preventing relative rotation therebetween.

11. An ice maker as in claim 6 including interengageable means on said head and said other disk for preventing relative rotation therebetween.

12. An ice maker as in claim 11 in which said first and second bearing disks are of identical configuration.

* * * * *